United States Patent
Nosseir et al.

(10) Patent No.: US 12,470,399 B2
(45) Date of Patent: Nov. 11, 2025

(54) METHODS AND SYSTEMS FOR OWNERSHIP VERIFICATION USING BLOCKCHAIN

(71) Applicant: Visa International Service Association, San Francisco, CA (US)

(72) Inventors: Mohamed Nosseir, Castro Valley, CA (US); Anil Somani, Foster City, CA (US); Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 80 days.

(21) Appl. No.: 17/843,890

(22) Filed: Jun. 17, 2022

(65) Prior Publication Data

US 2022/0321359 A1 Oct. 6, 2022

Related U.S. Application Data

(63) Continuation of application No. 16/616,871, filed as application No. PCT/US2018/035844 on Jun. 4, 2018, now Pat. No. 11,394,559.

(Continued)

(51) Int. Cl.
*H04L 9/32* (2006.01)
*H04L 9/08* (2006.01)
*H04L 9/00* (2022.01)

(52) U.S. Cl.
CPC .......... *H04L 9/3247* (2013.01); *H04L 9/0825* (2013.01); *H04L 9/083* (2013.01);
(Continued)

(58) Field of Classification Search
CPC ..... H04L 9/3247; H04L 9/0825; H04L 9/083; H04L 9/0861; H04L 9/0894; H04L 9/50;
(Continued)

(56) References Cited

U.S. PATENT DOCUMENTS 11,394,559 B2 7/2022 Nosseir et al.
2016/0330027 A1 11/2016 Ebrahimi
(Continued)

FOREIGN PATENT DOCUMENTS

CA 3017858 A1 2/2017
CN 105976232 A 9/2016
(Continued)

OTHER PUBLICATIONS

Extended European Search Report for EP Application No. EP18809759.6 mailed on Apr. 23, 2020, 10 pages.
(Continued)

*Primary Examiner* — Henry Tsang
(74) *Attorney, Agent, or Firm* — Kilpatrick Townsend & Stockton LLP

(57) ABSTRACT

A blockchain system for ownership verification may include one or more issuer network nodes and one or more verification network nodes. An issuer network node may be configured to receive a request including a public key to issue a credential, provision the credential to the communication device, generate a payload derived from hashing the credential and the public key, store the payload in a record of a blockchain, and synchronize the record to other network nodes on the blockchain. A verification network node may be configured to receive the credential, the public key, and a signature generated by the communication device to request access to a resource, verify the signature using the public key, generate a hash value based on the credential and the public key, determine that the hash value is stored in the blockchain, and authenticate the communication device for access to the requested resource.

19 Claims, 8 Drawing Sheets

Related U.S. Application Data

(60) Provisional application No. 62/514,109, filed on Jun. 2, 2017.

(52) U.S. Cl.
CPC .......... *H04L 9/0861* (2013.01); *H04L 9/0894* (2013.01); *H04L 9/50* (2022.05)

(58) Field of Classification Search
CPC . H04L 2209/56; H04L 9/3226; H04L 9/3239; H04L 9/321
See application file for complete search history.

(56) References Cited

U.S. PATENT DOCUMENTS

| | | |
|---|---|---|
| 2016/0330035 A1 | 11/2016 | Ebrahimi et al. |
| 2017/0075941 A1 | 3/2017 | Finlow-Bates |
| 2017/0111175 A1* | 4/2017 | Oberhauser ........ G06Q 20/4014 |
| 2017/0132626 A1 | 5/2017 | Kennedy |
| 2017/0147808 A1 | 5/2017 | Kravitz |
| 2017/0178127 A1 | 6/2017 | Kravitz |
| 2017/0180134 A1* | 6/2017 | King .................. H04L 63/0876 |
| 2017/0300678 A1* | 10/2017 | Metke ................ H04W 12/068 |
| 2018/0013567 A1* | 1/2018 | Davis ................. H04L 63/0876 |
| 2018/0101684 A1* | 4/2018 | Murphy .................. G06F 21/64 |

FOREIGN PATENT DOCUMENTS

| | | | |
|---|---|---|---|
| EP | 3523744 A1 | 8/2019 | |
| KR | 101637854 B1 | 7/2016 | |
| WO | WO-2016202952 A1 * | 12/2016 | .......... G06Q 20/065 |

OTHER PUBLICATIONS

Faisca et al., "Personal Cloud Interoperability", IEEE 17th International Symposium on a World of Wireless, Mobile and Multimedia Networks, Jun. 21, 2016, pp. 1-3.

International Search Report and Written Opinion Received International Appl. No. PCT/US2018/035844 mailed on Sep. 20, 2018, 10 pages.

Final Office Action, mailed Dec. 24, 2021, for U.S. Appl. No. 16/616,871, 9 pages.

First Action Interview Office Action Summary, mailed Sep. 20, 2021, for U.S. Appl. No. 16/616,871, 4 pages.

First Action Interview Pilot Program Pre-Interview Communication, mailed Jul. 14, 2021, for U.S. Appl. No. 16/616,871, 4 pages.

Notice of Allowance, mailed Mar. 18, 2022, for U.S. Appl. No. 16/616,871, 10 pages.

Notice of Decision to Grant, mailed Jul. 20, 2023, for Chinese Patent Application No. CN201880036586.3 , 4 pages.

Office Action, mailed Feb. 23, 2023, for Chinese Patent Application No. CN201880036586.3 , 15 pages.

Notice of Decision to Grant, mailed Sep. 16, 2021, for European Patent Application No. EP18809759.6, 2 pages.

International Preliminary Report on Patentability, mailed Dec. 12, 2019, for International Patent Application No. PCT/US2018/035844 7 pages.

Notice of Decision to Grant, mailed Nov. 22, 2021, for Singapore Patent Application No. SG11201910965X, 6 pages.

Written Opinion, mailed Jun. 4, 2021, for Singapore Patent Application No. SG11201910965X, 7 pages.

* cited by examiner

METHODS AND SYSTEMS FOR OWNERSHIP VERIFICATION USING BLOCKCHAIN

CROSS-REFERENCES TO RELATED APPLICATIONS

This application is a continuation of U.S. application Ser. No. 16/616,871, filed Nov. 25, 2019, which is a 371 National Phase Application of International Application No. PCT/US2018/035844, filed Jun. 4, 2018, which claims the benefit of priority to U.S. Provisional Application No. 62/514,109, filed on Jun. 2, 2017, which is herein incorporated by reference in its entirety for all purposes.

BACKGROUND

The first line of defense in computer security is to ensure an entity submitting credentials to request access to a service or resource is the proper owner of the credentials. For example, a user may provide an account identifier over the Internet to request access to a service or resource associated with the account. One technique to verify credential ownership is to request the user to additionally submit personally identifying information (PII) (e.g., address, phone number, email, biometrics, etc.). However, such technique diminishes user privacy, and many users are uncomfortable with providing PII, especially if the information is provided to third parties. Another technique is to use an out-of-band communication to verify the credential ownership. For example, a one-time code can be sent to the user's registered device or email, and the user can submit the one-time code to prove the identity of the user. Another example may require the user to make a phone call to the credential issuer or to separately log in to another account or device. However, such techniques may cause user friction and reduce the quality of the user experience.

Embodiments of the invention address these and other problems individually and collectively.

BRIEF SUMMARY OF THE INVENTION

Techniques to verify the ownership of a credential (e.g., an account identifier, etc.) or other sensitive asset or information using a blockchain and public-private key cryptography are described. A user can initially transmit a public key of a public-private key pair to an issuer, and request the issuer to provide a credential. The issuer can associate that public key with the credential assigned to the user, and generate a data payload detailing the association between the public key and the credential. The data payload can then be published or stored in a blockchain. When the user later attempts to access a service or resource using the credential, the user can provide the credential, the public key, and a signature generated with a private key of the public-private key pair. The signature can be used to verify the public key, and the blockchain can be queried to determine if a record of the association between the public key and the credential exists. The existence of such a record in the blockchain verifies that the user is the proper owner of the credential, because the user is in possession of the public-private key pair that was originally used to acquire the credential.

According to some embodiments, a blockchain system may include one or more issuer network nodes and one or more verification network nodes. An issuer network node can be configured to receive a request including a communication device public key to issue a credential for a communication device, determine the credential to issue to the communication device, provision the credential to the communication device, generate a payload derived from hashing the credential and the communication device public key, store the payload in a record of a blockchain, and synchronize the record to other network nodes on the blockchain. A verification network node can be configured to receive the credential, the communication device public key, and a communication device signature generated by the communication device to request access to a resource. A verification network node can be further configured to verify the communication device signature using the communication device public key, and in response to verifying the communication device signature, generate a hash value based on the credential and the communication device public key. A verification network node can be further configured to determine that the hash value is stored in the blockchain, and in response to determining that the hash value is stored in the blockchain, authenticate the communication device for access to the requested resource.

According to some embodiments, a computer implemented method may include receiving, by a credential issuer computer, a request to issue a credential for a communication device, the request including a communication device public key associated with the communication device. The method may also include determining the credential to issue to the communication device, provisioning the credential to the communication device, generating a payload derived from hashing the credential and the communication device public key, storing the payload in a record of a blockchain, and synchronizing the record to other network nodes on the blockchain.

According to some embodiments, a computer-implemented method may include receiving, by a network node associated with a blockchain, a credential, a communication device public key associated with a communication device, and a communication device signature to request access to a resource. The method may further include verifying the communication device signature using the communication device public key, and in response to verifying the communication device signature, generating a hash value based on the credential and the communication device public key. The method may also include determining that the hash value is stored in a record of the blockchain, verifying a record signature associated with the record of the blockchain, and in response to determining that the hash value is stored in the blockchain and verifying the record signature of the record, authenticating the communication device for access to the requested resource.

DETAILED DESCRIPTION

Figure 1:
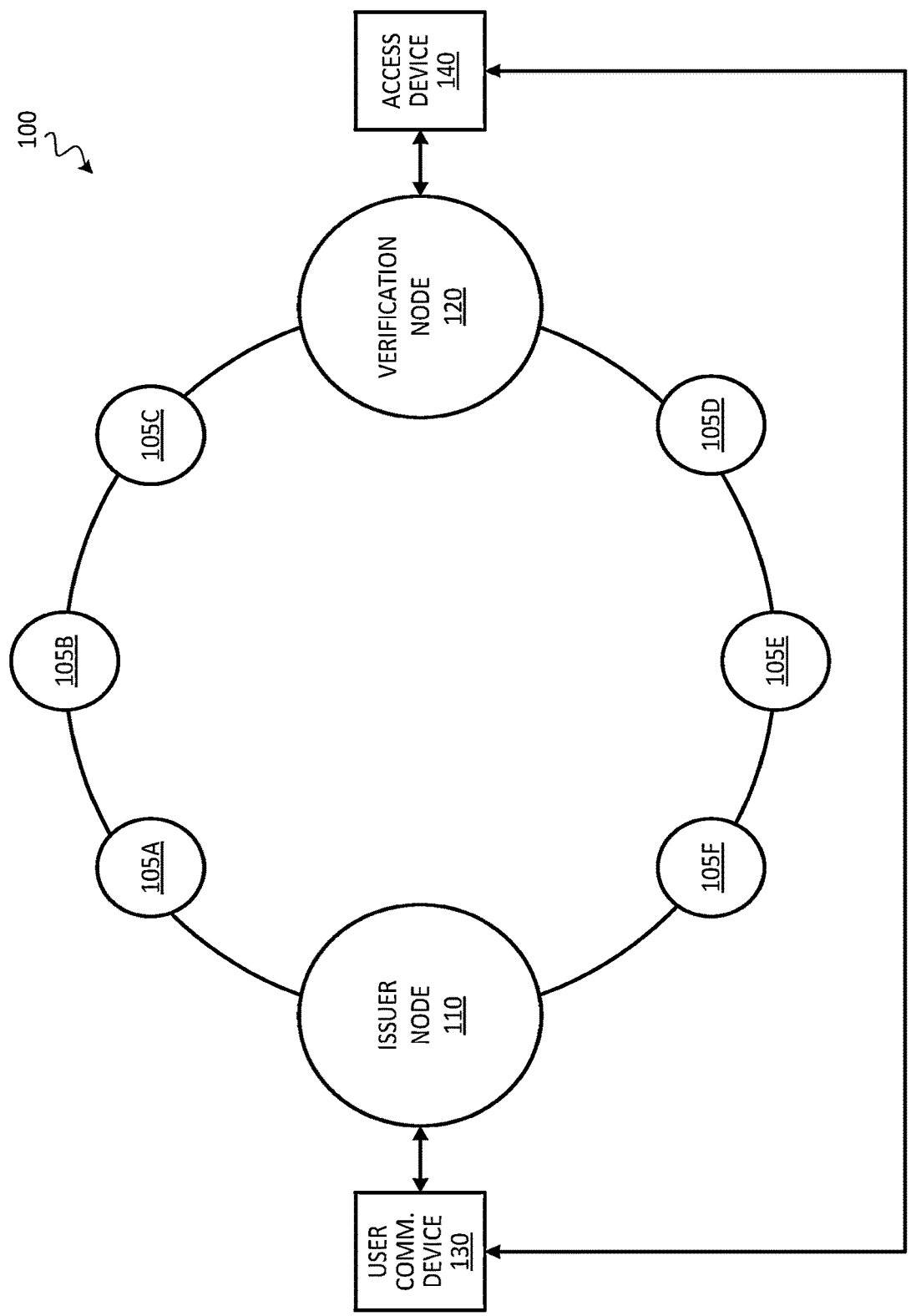
FIG. 1 illustrates a blockchain system, according to some embodiments.

Various embodiments of the present invention provide techniques to verify the ownership of a credential (e.g., an account identifier, etc.) or other sensitive asset or information using a blockchain and public-private key cryptography. A user can initially transmit a public key of a public-private key pair to an issuer, and request the issuer to provide a credential. The issuer can associate that public key with the credential assigned to the user, and generate a data payload detailing the association between the public key and the credential. The data payload can then be published or stored in a blockchain. When the user later attempts to access a service or resource using the credential, the user can provide the credential, the public key, and a signature generated with a private key of the public-private key pair. The signature can be used to verify the public key, and the blockchain can be queried to determine if a record of the association between the public key and the credential exists. The existence of such a record in the blockchain verifies that the user is the proper owner of the credential, because the user is in possession of the public-private key pair that was originally used to acquire the credential.

Prior to discussing various embodiments of the invention, an explanation of various terms are provided below.

A "blockchain" may refer to a distributed database. A blockchain can be used to maintain a continuously growing list of records called blocks. A blockchain can be used to maintain a record of transaction or events between parties in a way that is difficult to falsify. Each block in a blockchain may include several records as well as a hash of previous blocks in the blockchain. If a record in a previous block is changed, the hash may be disrupted in any following blocks. The result is that in order to falsify a given record, the hacker has to falsify that record and all subsequent records so that the hashes end up the same. This is extremely difficult in practice. Additionally, a blockchain may be distributed among a large number of entities. Any changes to the blockchain may be verified by comparing it to the numerous individual records.

A "record" may refer to evidence of one or more interactions. A digital record can be electronic documentation of an interaction. A record can include a record identifier and record information. For example, record information can include information describing one or more interactions and/or information associated with the interactions (e.g., a digital signature). Record information can also include multiple data packets each of which include different data describing a different interactions. A record identifier can be a number, title, or other data value used for identifying a record. A record identifier can be nondescript, in that it may not provide any meaningful information about the record information in the record. Examples of records include medical records, academic records, transaction records, credential issuance records, etc. In some embodiments, a record can be stored in a block of a blockchain. An individual block may include an individual record or a predetermined number of records, and a blockchain can be a series of records organized into blocks.

A "node" or "network node" may refer to a connection point in a communication network. A network node can be a physical electronic device that is capable of creating, receiving, or transmitting data. In some embodiments, a network node may be a computing device within a record-keeping network (e.g., a blockchain network). A network node may be able to create a data package (e.g., a data payload), transfer a data package, receive a data package, validate a data package, access a central record, and/or perform any other suitable functions. Different types of network nodes may be able to perform different sets of functions within a recording network. In some embodiments, a network node may be associated with and/or operated by a resource provider such as an online service provider, a content provider, a certificate authority, a financial institution (e.g., a bank), a merchant, a transaction processing network, or any other suitable entity.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm.

A "digital certificate" may refer to an electronic document used to demonstrate ownership. A digital certificate can include a public key or information about a public key, along with the identity of the owner of that public key, and a digital signature (e.g., data which indicates the entity that verified that the listed owner actually owns the public key). This digital signature can be a message encrypted using the verifying entity's private key. An entity can decrypt the message using the verifying entity's public key to identify the verifying entity.

A "certificate authority" may refer to a trusted entity that issues certificates to other entities to certify the identities. For example, a certificate authority may issue a digital certificate that includes information about a cryptographic key and information about the identity of the owner of the key. The digital certificate can be signed by the certificate authority to certify the validity of the certificate's contents. Examples of a certificate authority may include network operator, web domain provider, transaction processor or processing network, etc.

A "signature" may refer to an electronic signature for a message or some data. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

A "user" may refer to an entity such as a person, an organization, or a device or system associated with or operated by the person or organization that utilizes a resource for some purpose. A user may have one or more accounts that can be used to access the resource. A user may also be referred to as an account holder, a consumer, a subscriber, or a cardholder, etc., according to some embodiments.

A "resource" may refer to a service, an item, a location, data, information, or something of value that assists a user with achieving some purpose. Some resources may be restricted, and may require a user to have an account to access the resource. Examples of resources may include software applications and related functions; online services including cloud services; goods (virtual and/or physical objects) or services related to transactions; credits, points, and/or currencies that can be exchanged for other resources; electronic devices such as servers, computers, mobile devices, gaming systems, etc.; transportation such as vehicles or transit services, communications capabilities such as wireless services; restricted areas; media content; etc.

A "resource provider" may refer to an entity that can provide resources. Examples of resource providers may include service providers such as web service providers, social networks, issuers, banks, merchants, governmental agencies, transaction processing networks, etc.

A "credential" may refer to a piece of data that can be used to access a resource. A credential can be linked to an account, and verification of the credential may be required to gain access to a resource associated with the account. Examples of a credential may include an account identifier such as a primary account number, a token that can be used as a substitute for an account identifier, a username or user identifier, a password, a passcode, a PIN, a cryptographic key, a digital certificate, biometric data, etc. In some embodiments, a credential can also be a digital asset provided there exists a trusted custodian that can attest to the ownership of the asset. For example, a digital asset can be a driver's license or a vehicle identification number (VIN) issued by Department of Motor Vehicles, or a parcel number issued by a housing authority to identify land that the user owns, a document number issued by a document recordation service, etc.

A "communication device" may refer to a device that includes one or more electronic components (e.g., an integrated chip) that can communicate with another device or entity. For example, a communication device can be a computing device that includes at least one processor coupled to a memory that stores instructions or code for execution by the processor, and may include a communication interface that allows the communication device to interact with other entities. A communication device can be a portable communication device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, bracelet, ring, eyeglasses, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle). Other examples of communication devices may include Internet of Things (IoT) devices, smart appliances and electronics, gaming consoles, etc. A communication device may also include multiple devices or components (e.g., when a device has remote access to a network by tethering to another device—both devices taken together may be considered a communication device).

A "server computer" may refer to a powerful computer or cluster of computers. For example, the server computer can be a large mainframe, a minicomputer cluster, or a group of servers functioning as a unit In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" or "credential issuer" may refer to an entity that maintains an account for a user. An issuer may provide or issue a credential to a user, and the credential can be used to access the account or a resource associated with the account. The account can be associated with a communication device such as an account enrolled in an application installed on a communication device. An issuer can also be associated with a host system that performs some or all of the functions of the issuer on behalf of the issuer. Examples of an issuer may include a service provider, a bank, a merchant, a governmental agency, a transaction processor, etc.

An "access device" may refer to a suitable device for communicating with a resource provider. In some embodiments, an access device can be a web server, a merchant computer, or a transaction processing network that can interact with a user communication device. An access device may generally be located in any suitable location, such as at the location of the service provider or a merchant, or can be at a remote location (e.g., in the cloud). Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data with a communication device. In some embodiments, an access device may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a communication device.

A "real account identifier" may refer to an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "token" may refer to a substitute identifier for some information. For example, a token may include an identifier for an account that is a substitute for a real account identifier such as a primary account number (PAN). For instance, a token may include a series of alphanumeric characters that may be used as a substitute for an original account identifier (e.g., a token "4900 0000 0000 0001" may be used in place of a PAN "4147 0900 0000 1234"). In some embodiments, a token may be format preserving and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "authorization request message" may refer to an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also include transaction information, such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may refer to a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "hash" may refer to data returned by a hash function (e.g., a function that can be used to map data of arbitrary size to data of fixed size). A hash can be used to uniquely identify secret information. In many cases, it is statistically unlikely that two different input data values have the same hash. Examples of hashing algorithms may include MD5, MD6, SHA variants, etc.

"Authentication" or "authenticating" may refer to the process of proving or verifying certain information, and/or verifying the identity of the source of that information. For example, a user may provide authentication data (e.g., a credential) that is unique or only known to the user to prove the identity of the user. Examples of different types of authentication data may include biometrics, password, passcode, PIN, answers to security question(s), cryptographic response to challenge, human and/or device signature, etc.

FIG. 1 illustrates a blockchain system 100, according to some embodiments. System 100 may include multiple network nodes 105A-105F, 110, and 120 communicatively coupled to each other via a communications network such as the Internet; a Local Area Network (LAN); a Metropolitan Area Network (MAN); a Wide Area Network (WAN); a wireless network; a transaction processing network; or a combination thereof. Each of the network nodes 105A-105F, 110, and 120 may maintain a copy of a blockchain that contains records of credentials issued by or recorded with system 100. Each of the network nodes in blockchain system 100 can act as either an issuer node, a verification node, or a combination thereof. In some embodiments, every node in blockchain system 100 can act as a verification node, while a subset of the nodes can also act as an issuer node. In some embodiments, blockchain system 100 can be a permissioned system in which only known or trusted entities can become members. This is in contrast to open blockchain systems such as Bitcoin in which anyone can be a participant. In some embodiments, members of blockchain system 100 may include resource providers including online service providers, credential issuers, merchants, transaction processors, or other entities that can maintain and/or verify user accounts, etc.

Blockchain system 100 may include one or more issuer node 110 that is associated with or operated by a credential issuer. Issuer node 110 may process requests from users to obtain credentials that the users can use to access a resource. For example, issuer node 110 may issue an account identifiers when a user signs up or opens an account with a resource provider. As another example, some credentials such as a token or a cryptographic key may have a limited lifespan, and issuer node 110 may replenish such credentials for a user as they expire. When issuer node 110 issues a credential to a user, issuer node 110 may publish a record of the credential issuance to the blockchain at issuer node 110. In some embodiments, the credential can be provided by the user, and issuer node 110 can be used to publish a record of the user-provided credential to the blockchain at issuer node 110.

The record of the credential is also synchronized to the other network nodes of blockchain system 100. For example, issuer node 110 may broadcast the record to one or more of network nodes 105A-105F and 120 to add the record to copies of the blockchain at the respective network nodes. In some embodiments, one or more certificate authorities that are associated with the issuers in blockchain system 100 can be used to synchronize the record. In other words, issuer node 110 may provide the record to a certificate authority, and the certificate authority can publish the record to every network node in blockchain system 110.

Blockchain system 100 may also include one or more verification node 120 that is associated with or operated by a resource provider in the system. Verification node 120 may process request from users to access a resource. For example, verification node 120 may receive a credential from a user to request access to a resource associated with the credential. Verification node 120 may verify the credential by querying the blockchain at verification node 120 to determine if a record of the credential exists in the blockchain. If a record of the credential exists in the blockchain, verification node 120 may authenticate the user and grant the user access to the requested resource.

To interact with blockchain system 100, a communication device 130 operated by a user may send a request for a credential to issuer node 110. The credential can be associated with a resource provider, and may be used to request access to the resource. Issuer node 110 may determine a credential to issue to communication device 130 for the user, provision the credential to communication device 130, and publish the credential to the blockchain maintained by blockchain system 100. In some embodiments, a user may be given a choice to select his/her own credential, and communication device 130 may provide the credential to issuer node 110 to request issuer node 110 to record the user-provided credential to the blockchain.

Once the credential has been provisioned to communication device 130 and recorded to the blockchain, communication device 130 may submit the credential to request access to a resource. The credential may include account information identifying an account of the user associated with the resource provider, or other authentication information that is used to authenticate the user and/or communication device 130. In some embodiments, communication device 130 may provide the credential to an access device 140 to request access to the resource. Examples of resources that may be requested can include access to restricted content or information, access to an online account of a user, access to a network resource, access to a restricted area, access to goods or services related to a transaction, etc.

Access device 140 may submit the credential to verification node 120 to authenticate the user and/or communication device 130. Upon receiving the credential, verification node 120 may query the blockchain to determine if a record of the credential is stored in the blockchain. If a record of the credential exist in the blockchain, verification node 120 may indicate to access device 140 that the credential is valid, and access to the resource can be granted. If a record of the credential does not exist in the blockchain or is indicated to have expired, access to the resource can be denied. It should be noted that in some embodiments, communication device 130 may request access to the resource directly with verification node 120 without going through an access device. For example, verification node 120 can be a webserver operated by the resource provider, and communication device 130 can communicate with verification node 120 to request access to the resource using a web browser or other application installed on communication device 130.

Figure 2:
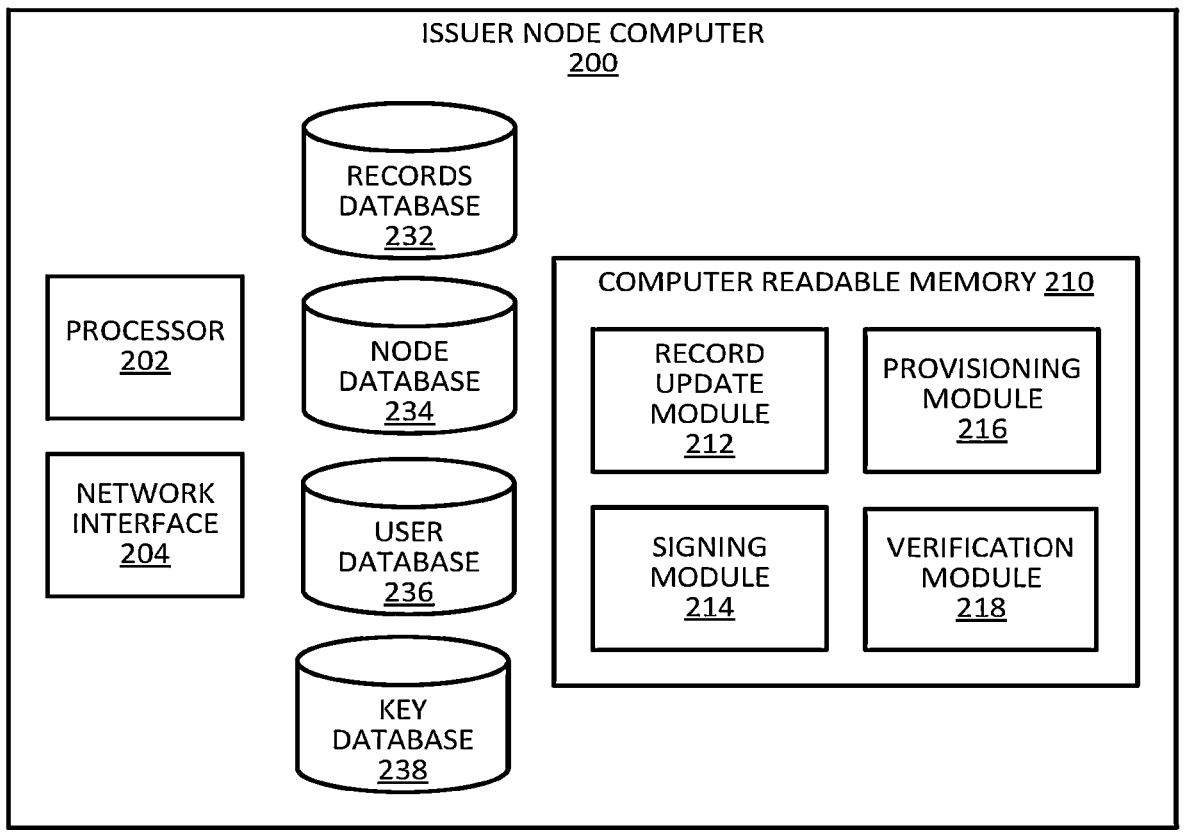
FIG. 2 illustrates a block diagram of an issuer node computer, according to some embodiments.

FIG. 2 illustrates a block diagram of an issuer node computer 200, according to some embodiments. Issuer node computer 200 may include a processor 202, a network interface 204, a records database 232, a node database 234, a user database 236, a key database 238, and a computer readable memory 210 storing code executable by processor 202.

Records database 232 may store records of credentials issued by issuer node computer 200 as well as credentials issues by other issuers in the system. For example, a record of a credential being issued by issuer node computer 200 can be inserted and stored in records database 232. In some embodiments, the records can take the form of a blockchain organized into blocks of one or more records. Each record may contain a hash value derived from hashing a credential, and other data such as a public key associated with the user of the credential and a hash of a previous block.

Node database 234 may store information about network nodes in the system that maintains a record database. For example, node database 234 can include identifiers such as IP addresses of other network nodes in the system. This information can be used by issuer node computer 200 to provide new records to the other network nodes to synchronize the record databases in the system.

User database 236 may store information about users and their communication devices enrolled with a resource provider associated with issuer node computer 200. The user information may include name, address, email, phone number, biometrics, and/or answers to security questions, etc. that can be used to identify a user. Device information may include serial number, device alias, Internet Protocol (IP) address, media access control (MAC) address, Mobile Subscriber Integrated Services Digital Network (MSISDN) number or other communication number associated with the communication device, International Mobile Subscriber Identity (IMSI) number, International Mobile Station Equipment Identity (IMEI) number, or other mutable or non-mutable device identification characters. The information in user database 236 can be used to verify the identity of a user and his/her communication device when processing a request for a credential from the user.

Key database 238 may store cryptographic keys that are used by issuer node computer 200. For example, key database 238 may store public keys associated with other issuers or certificate authorities such that issuer node computer 200 can verify signatures signed by these other entities. Key database 238 may store an issuer private key that issuer node computer 200 can use to generate signatures. In some embodiments, key database 238 can be implemented using a hardware security module (HSM).

Computer readable memory 210 may include a record update module 212, a signing module 214, a provisioning module 216, a verification module 218, and/or other suitable software modules. One or more these software modules may include code executable by processor 202 to perform functionalities including processing a request to issue a credential associated with a resource for a communication device, determining the credential to issue to the communication device, provisioning the credential to the communication device, generating a payload derived from hashing the credential and the communication device public key, storing the payload in a record of a record database, and synchronizing the record to other network nodes.

Provisioning module 216 may provide functionality to determine a credential to issue to a user and to provision that credential to a communication device of the user. For example, provisioning module 216 may include a random number generator or other algorithms to generate credentials for a user, or may provide functionality to lookup credentials assigned or mapped to a user or account. Provisioning module 216 may also implement communication protocols used to provision or store credentials to a user communication device. In some embodiments, the credential can be stored in a secured memory of the user communication device, and provisioning module 216 may implement a protocol for accessing the secured memory.

Signing module 214 may provide functionality to generate digital signatures. For example, signing module 214 may implement logic to generate a digital signature for a data payload using an issuer key (e.g., issuer private key). The digital signature can provide an attestation from the issuer to indicate the authenticity of the data payload.

Verification module 218 may provide functionality to verifying the existence and validity of a record in records database 232. For example, verification module 218 may implement logic to generate a hash value from data being queried, and search records database 232 to determine if there is a record that contains the hash value. Verification module 218 may also verify the authenticity of the record by verifying one or more digital signatures associated with that record, and to verify whether the contents of the record has expired.

Record update module 212 may provide functionality to maintain and update a set of records such as those in records database 232. For example, record update module 212 may provide logic to generate hash values from data payloads for storage as records in records database 232. Record update module 212 may also send update notifications to other network nodes to synchronize the records at the other network nodes with the new record. Record update module 212 may also receive an update notification from other network nodes to add a new record to records database 232. Record update module 212 may request verification module 218 to verify a signature of the new record received from the other network nodes before adding the new record to records database 232.

Figure 3:
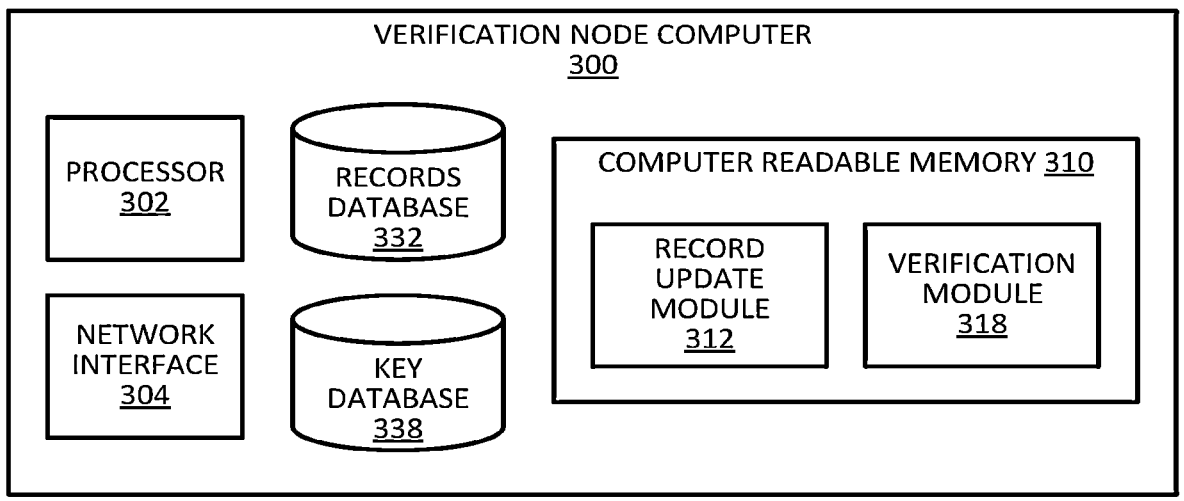
FIG. 3 illustrates a block diagram of a verification node computer, according to some embodiments.

FIG. 3 illustrates a block diagram of a verification node computer 300, according to some embodiments. Verification node computer 300 may include a processor 302, a network interface 304, a records database 332, a key database 338, and a computer readable memory 310 storing code executable by processor 302. Computer readable memory 310 may include a record update module 312, a verification module 318, and/or other suitable software modules. One or more these software modules may include code executable by processor 302 to perform functionalities including receiving a credential, a communication device public key, a communication device signature generated by a communication device to request access to a resource. The functionalities may also include verifying the communication device signature using the communication device public key, generating a hash value based on the credential and the communication device public key, determining that the hash value is stored in records database 332, and authenticate the communication device for access to the requested resource.

The various components of verification node computer 300 are similar to those of issuer node computer 200 described above, and thus a detail description of which need not be repeated. Verification node computer 300 may differ from issue node computer 200 in that verification node computer 300 may lack the capability to issue and provision credentials, and thus may lack the ability to generate new records. Verification node computer 300 may nevertheless receive new records from other network nodes in the system, and update records database 332 accordingly.

Figure 4:
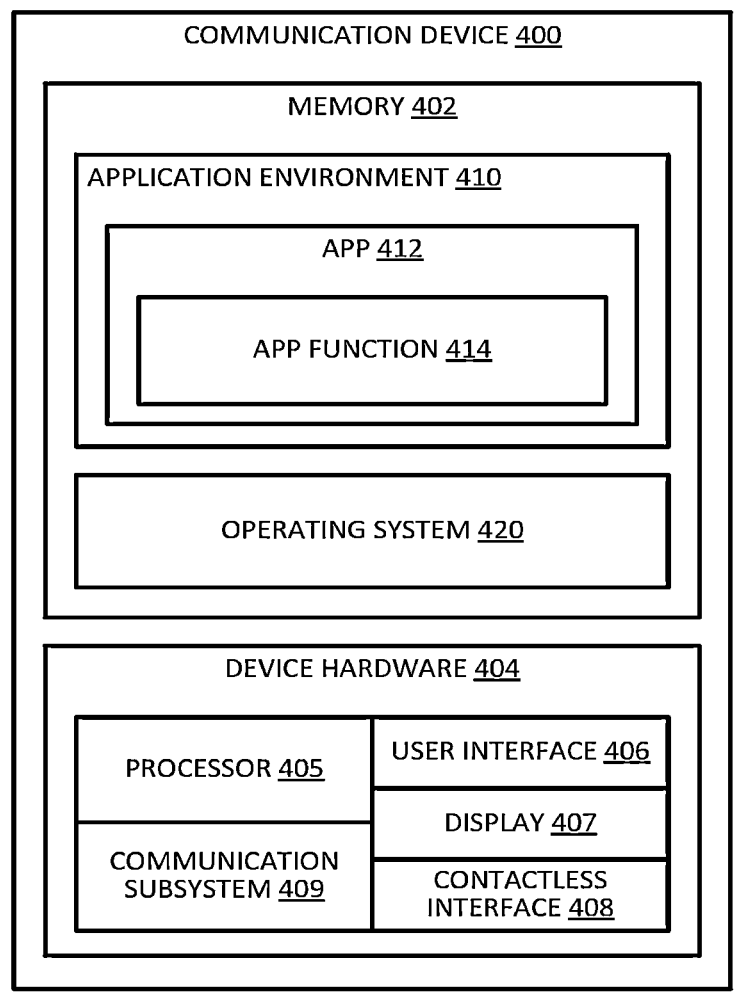
FIG. 4 illustrates a block diagram of a communication device, according to some embodiments.

FIG. 4 illustrates a block diagram of a communication device 400, according to some embodiments. Communication device 400 may include device hardware 404 coupled to a memory 402. Device hardware 404 may include a processor 405, a communication subsystem 406, user interface 406, a display screen 407 (which may be part of user interface 406), and a contactless interface 408. Processor 405 can be implemented as one or more integrated circuits (e.g., one or more single core or multicore microprocessors and/or microcontrollers), and is used to control the operation of communication device 400. Processor 405 can execute a variety of programs in response to program code or computer-readable code stored in memory 402, and can maintain multiple concurrently executing programs or processes. Communications subsystem 409 may include one or more RF transceivers and/or connectors that can be used by communication device 400 to communicate with other devices and/or to connect with external networks. User interface 406 can include any combination of input and output elements to allow a user to interact with and invoke the functionalities of communication device 400. In some embodiments, display screen 407 may be part of user interface 406.

Contactless interface 408 may include one or more RF transceivers to interact with a contactless reader of an access device to conduct a transaction (e.g., payment transaction, access transaction, information exchange, etc.). In some embodiments, contactless interface 408 can be accessed by the operating system 420. In some embodiments, display 407 can also be part of contactless interface 408, and is used, for example, to perform transactions using QR codes, bar codes, etc.

Memory 402 can be implemented using any combination of any number of non-volatile memories (e.g., flash memory) and volatile memories (e.g., DRAM, SRAM), or any other non-transitory storage medium, or a combination thereof media. Memory 402 may store operating system 420 and an applications environment 410 where one or more applications 412 implementing application functions 414 reside. Applications 412 may include a provider specific application used for accessing a resource from a resource provider, general purpose application such as a web browser, or other suitable applications. Examples of applications may include a wallet or banking application, payments application, merchant application, etc. In some embodiments, application functions may include generating a communication device public-private key pair, generating a communication device signature using the communication device private key, communicating with issuers to initiate requests for credentials, storing credentials on communication device 400, and interacting with a network node to request access to a resource.

Figure 5:
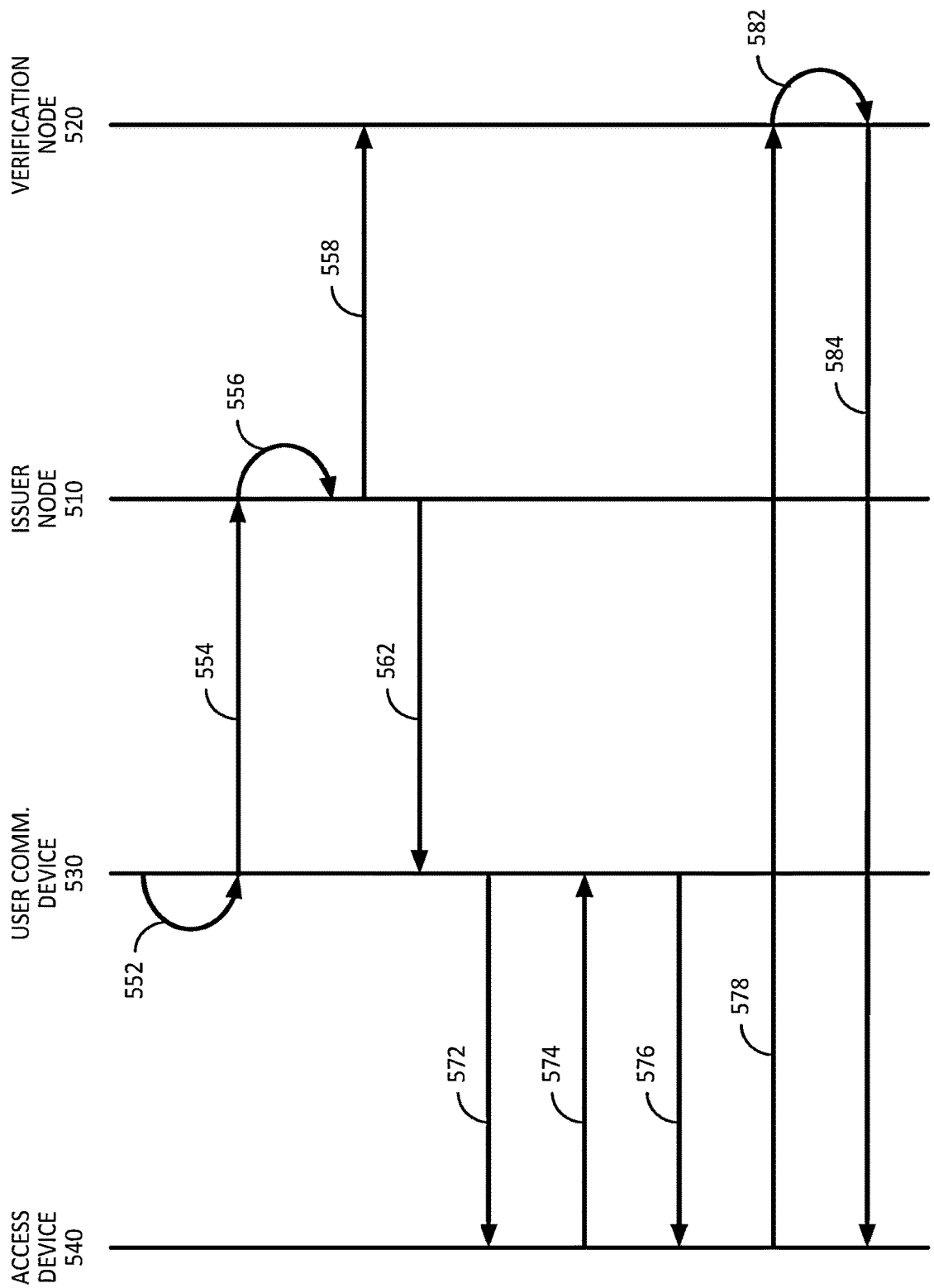
FIG. 5 illustrates a communications flow diagram of the interactions with a blockchain system, according to some embodiments.

FIG. 5 illustrates a communications flow diagram of the interactions with a blockchain system for credential issuance and ownership verification, according to some embodiments. Operations 552 to 562 relate to credential issuance by an issuer, and operations 572 to 584 relate to verification of the credential when a user requests access to a resource associated with the credential. It should be noted that in some embodiments, the issuer node 510 and verification node 520 can be the same network node.

At operation 552, a user may operate communication device 530 to generate or otherwise obtain a communication device public-private key pair. In some embodiments, the communication device public-private key pair can be preloaded onto communication device or be generated by an application installed on communication device 530. The application can be an application provided by a resource provider to allow communication device 530 to access one or more resources associated with the resource provider, or a general purpose application such as a web browser that can be used to communicate with or access various resource providers.

In some embodiments, the communication device public-private key pair can be credential specific such that different key pairs are generated for each credential, or can be account specific such that different key pairs are generated for each account of the user but the same public-private key pair is used for multiple credentials (e.g., multiple tokens) associated with the same account. The communication device public-private key pair can also be resource provider specific such that different key pairs are generated for different resource providers, but the same key pair is used for multiple credentials and/or accounts of the user associated with the same resource provider. The communication device public-private key pair can also be communication device specific such that the same key pair is used for credentials for various accounts and resource providers provisioned to the same communication device. The communication device public-private key pair can also be specific to any combination of the above. The communication device public-private key pair can be generated using a suitable algorithm such as integer factorization or discrete logarithms. In some embodiments, the communication device public-private key pair can be generated by a remote server and provided to communication device 530.

At operation 554, communication device 530 may send a request to issuer node 510 to request issuer node 510 to issue a credential associated with a resource. The request may include the communication device public key of the communication device public-private key pair generated or obtained in operation 552. The request may also include other use identification information that issuer node 510 can use to verify the identity and/or account of the user. For example, in some embodiments, the credential being requested can be a token that is used as a substitute for an account identifier, and the request may include information identify the account. In some embodiments, the request can be transmitted when the user logs into an application or website associated with issuer node 510. In some embodiments, communication device 530 may provide its own credential, and issuer node 510 can be requested to record the credential to the blockchain. This may occur, for example, if the user is provided with the option to select his/her own credential such as a username and/or password.

At operation 556, issuer node 510 may verify the identity and/or account of the user, and determine the credential to issue to communication device 530 for the user. In some embodiments, the credential can be randomly generated by issuer node 510 or be generated according to a predetermined algorithm. In embodiments in which the requested credential is a token, issuer node 510 may determine the token to issue by querying a token vault that stores mappings of account identifiers and tokens assigned to the account identifiers. Issuer node 510 may then generate a data payload that is derived from the credential and the communication device public key provided by communication device 530. For example, the data payload may include a hash of the credential and the communication device public key. In some embodiments, the data payload can be derived by hashing the credential, the communication device public key, and a hash of the previous block of the blockchain. Including a hash of the previous block can reduce the risk of a record being falsified as each block in the blockchain depends on the previous blocks of the blockchain. Issue node 510 may then publish the data payload to the blockchain by storing the data payload as a record in the current block of the blockchain.

According to some embodiments, the blockchain can be organized into blocks, and each block may contain one or more records. Each record can represent an association between a credential and a communication device public key. Each block may include a block identifier that can be used to query the blockchain for a record. The block identifier can be a sequential number, a random number, or a hash of the previous block of the blockchain, etc. In some embodiments, credentials from different issuers can be maintained in separate blockchains or be combined into a single blockchain maintained by the system.

In some implementations, in addition to the data payload, each record may also include one or more digital signatures. For example, the data payload can be signed by issuer node 510 using a signature key to generate a record signature for the record. The signature key can be an issuer key that is specific to the credential issuer. In some embodiments, issuer node 510 may provide the data payload to a certificate authority, and the certificate authority may sign the data payload using a certificate authority key to generate the record signature. Each record can also be signed by both the corresponding issuer and a certificate authority. For example, the data payload can be signed by the issuer with an issuer key, and separately be signed by a certificate authority with a certificate authority key to generate two signatures for the record. As another example, the data payload can be signed by the issuer with an issuer key, and the data payload together with the signature generated by the issuer can be signed by the certificate authority with a certificate authority key.

The record including the data payload and any signatures can then be synchronized to other network nodes in the blockchain system. For example, at operation 558 issuer node 510 may send a notification to verification node 520 as well as other network nodes to update the copy of the blockchain at verification node 520. The notification may include the record (e.g., data payload and any signatures) to add to the blockchain. In some embodiments, issuer node 510 may provide the record to one or more certificate authorities, and the certificate authorities can send update notifications to the other network nodes of the blockchain system.

At operation 562, issuer node 510 provisions the requested credential to communication device 530. Issue node 510 may also provide the block identifier of the block in the blockchain containing the record of the credential to communication device 530. For example, issuer node 510 may store the credential and the block identifier in a secured memory of communication device 530, and associate them with the public key and the user's account for the resource provider. Communication device 530 may then use the credential to request access to the resource associated with the resource provider.

For example, at operation 572, communication device 530 may interact with an access device 540 to request access to a resource. Access device 540 can be, for example, a computing device (e.g., a web server) that provides the user access to the resource, a point-of-sale terminal, a transit or restricted area gate, etc. Communication device 530 may provide the credential and the communication device public key to access device 540 to request access to the resource. In some embodiments, communication device 530 may also provide the block identifier identifying the block containing a record of the credential in the blockchain to access device 540.

Access device 540 may verify the communication device public key by providing a cryptographic challenge to communicate device 530 at operation 574, and communication device 530 may provide a response to the cryptographic challenge at operation 576. For example, access device 540 may provide a numeric value to communication device 530, and communication device 530 may encrypt or sign the numeric value using the communication device private key of the communication device public-private key pair to generate a communication device signature, and send the communication device signature back to access device 540. The communication device public key received at operation 572 can be verified if access device 540 can properly decrypt the communication device signature using the communication device public key to retrieve the numeric value. In some embodiments, the numeric value can be a nonce, a random numeric string, or an unpredictable number generated by access device 540 or by a verification node of the blockchain system. In some embodiments, the numeric value can be transaction data (e.g., transaction amount, etc.) associated with a transaction being conducted with access device 540.

The communication device signature can alternatively be generated from verifiable data that is already available on communication device 530, and thus the numeric value need not be provided by access device 540. In such embodiments, the communication device signature can be provided to access device 540 as part of operation 572. For example, the numeric value can be the block identifier of the block containing the record of the credential in the blockchain. The communication device signature can be decrypted using the communication device public key, and the result can be used to query the blockchain for the record. The numeric value can also be the credential itself and/or the communication device public key. In some embodiments, the numeric value can also be other data required by the resource provider such as a billing address, or other user identifying data, etc. In some embodiments, access device 540 may not verify the communication device signature itself, and may transmit the communication device signature to a verification node for verification.

At operation 578, access device 540 may send the credential and the communication device public key received from communication device 530 to verification node 520 to determine if the blockchain contains a record of the association between the credential and the communication device public key. In some embodiments, operation 578 is performed after access device 540 has verified the communication device signature. In some embodiments, the communication device signature is sent with the credential and the communication device public key to verification node 520. In such embodiments, verification node 520 may verify the communication device signature before querying the blockchain. For example, verification node 520 may decrypt the communication device signature using the communication device public key to obtain the block identifier, and then query the blockchain using the decrypted block identifier.

At operation 582, verification node 520 may query the blockchain to determine if a record of the credential exists in the blockchain. For example, verification node 520 may generate a hash of the received credential and communication device public key, and check if the hash value is stored in the blockchain. In some embodiments, if communication device 530 provides a block identifier (e.g., can be encrypted in the communication device signature, or sent together with the credential and the communication device pubic key, etc.), verification node 520 can look up the block identified by the block identifier, and determine if the hash value is stored in that block. In embodiments in which the record is further derived from a hash of the previous block in the blockchain, verification node 520 may look up the hash of the previous block using the block identifier. Verification node 520 may generate a hash value from the received credential, the public key, and the hash of the previous block, and determine if the hash value is stored in the block associated with the block identifier. In some embodiments, the block identifier can be the hash of the previous block, and the block identifier can be used directly as the input to the hash function.

If the hash value exists in the blockchain, verification node 520 can determine that the owner of the public key is also the owner of the credential, and thus communication device 530 and its user can be authenticated for access to the requested resource. In some embodiments, if the record includes any signatures (e.g., signature generated by issuer and/or certificate authority), the signatures are also verified before communication device 530 and its user can be authenticated. Verifying the record signatures provide additional assurance that the credential was issued by a valid source. In some embodiments, the credential may have a limited lifespan, and may expire after a predetermined amount of time or predetermined amount of usage. In such embodiments, each record in the blockchain may also include a tag indicating whether the credential associated with the record has expired or not. The communication device 530 and its user can be authenticated if the tag associated with the record indicates the credential is still valid and has not expired. At operation 584, verification node 520 sends the authentication result to access device 520, and access device 540 may grant the user access to the requested resource based on the authentication result. It should be noted that in some embodiments, access device 540 and verification node 520 can be part of the same network node or be part of the same device. In some embodiments, some of the functionality of access device 540 can be performed by verification node 520, or vice versa.

The blockchain system and the interactions described with reference to FIGS. 1 and 5 can be implemented in a transaction system, according to some embodiments. For example, the network nodes in the blockchain system may include banks and/or transaction processors as issuers, merchants, acquirers who managed accounts for merchants, transaction processing networks (e.g., Visa, Mastercard, etc.), and/or third-party transaction service providers such as mobile wallet providers, etc.

A portable communication device (e.g., mobile phone, smartcard, etc.) operated by a user and being used as a payment device may transmits a communication device public key to an issuer such as a bank or transaction processor that issues account identifiers such as PANS or tokens that act as substitutes for account identifiers. In some embodiments, the transmission of the communication device public key can be accomplished by the user logging into an online banking application, mobile wallet application, merchant application, or website managed by or associated with the issuer, etc. The issuer may verify the identity of the user, and determine the account identifier (e.g., PAN, token, etc.) to issuer to the user. This may involve the issuer checking a database of users and/or accounts managed by the issuer and determining an account identifier associated with the user or associated with a communication device of the user.

The issuer can then create a payload or message including the communication device public key provided by the user and the account identifier, and sign the message with the issuer's private key. The issuer may transmit this message to a transaction processing network. The transaction processing network (e.g., acting as a certificate authority) may then publish the account identifier and the communication device public key to a blockchain managed by the transaction processing network, and synchronize the blockchain across the network nodes in the system. In some embodiments, the issuer may be able to publish the communication device public key and account identifier to the blockchain itself, and synchronize it to other network nodes without sending it to the transaction processing network. In some embodiments, the issuer may publish a hash of the account identifier and communication device public key rather than the actual values to preserve user privacy. The hash being published may additionally be computed over a hash value of a previous block in the blockchain. The issuer may return a block identifier to the user, so that the location in the blockchain where the record is held can be identified.

In some embodiments, the issuer can digitally sign the records that it publishes to the blockchain, attesting to other entities that the issuer was the entity issuing the account identifier. However, the blockchain system may have hundreds or thousands of different issuers, and using an issuer signature may require each network node in the system to establish every issuer as a trusted entity. As such, in some embodiments, the transaction processing network can attest to other entities such as issuers, merchants, and/or wallet providers that it has verified the identity of the issuer issuing the account identifier. In this manner, the transaction processing network may serve as a root certificate authority for the issuer certificates. By serving as the root certificate authority, the transaction processing network may simplifies the trust process associated with digital certificates. Rather than each merchant needing to establish trust with each issuer, the transaction processing network can establish trust with the issuer and then the merchants only need to trust the transaction processing network. The transaction processing network can sign the certificates of the issuers, in essence attesting that the issuers should be trusted. This allows merchants to simply trust the transaction processing network rather than a comparatively large number of issuers.

In some embodiments, the transaction processing network can further add its own signature on the record published on the blockchain. This can serve as an added measure of confidence. The transaction processing network is in effect declaring that the issuer who is publishing the record is indeed the issuer of the account identifier associated with the record. This may protect against scenarios where one issuer mistakenly publishes a record to attest the ownership of an account identifier issued by another issuer. In some embodiments, the transaction processing network signature can be used in place of the issuer signature.

To conduct a transaction using the issued account identifier, the user may provide the account identifier and the communication device public key to a merchant (e.g., via a POS terminal, or website, etc.). The user may also provide a challenge message signed by the communication device private key. In some embodiments, the challenge message can be provided to the user by the merchant, and can be in the form of a nonce, or a randomly generated numeric sequence. In some embodiments, the block identifier or other payment data required by the merchant, such as a billing address, can be used as the challenge message. The merchant may first verify that the provided communication device public key is able to properly decrypt the challenge message signed with the communication device private key. The merchant may then check the records in the blockchain managed by the transaction processing network. If the merchant is able to find a record indicating that the communication device public key and account identifier are associated with one another, the merchant can the authenticate the user as the owner of both the communication device public key and the account identifier, and thus verifying ownership of the account identifier.

The techniques described herein may enable a user to prove their ownership of the credential (e.g., PAN or token) without having to surrender any PII information beyond the credential data. This provides a marked increase in consumer privacy over conventional techniques. Furthermore, the blockchain system according to some embodiments yields lower integration cost to issuers. Issuers do not need to be involved every time the user needs to verify their credential ownership. Instead, an issuer only needs a single interaction with the user before credential ownership verification is required. Additionally, the techniques described herein also reduce consumer friction as compared to conventional techniques. While the consumer may still need to take some action during credential ownership verification, the process is much easier and more seamless than conventional techniques. For example, the user will not have to enter large amounts of PII or be redirected to an issuer webpage in order to be authenticated.

Moreover, in implementations in which merchants are members of the blockchain network, the credential verification can be performed locally at the merchant without have to transmit the credential to an issuer. This can be advantageous, for example, in environments where continuous network connectivity between the merchant and issuer is unavailable. The credential ownership verification process can also be performed faster, because the verification can be done locally without having to transmit the credential over a network. This can be advantageous in environments such as mass transit systems where it is beneficial to reduce transaction processing speed as much as possible.

Figure 6:
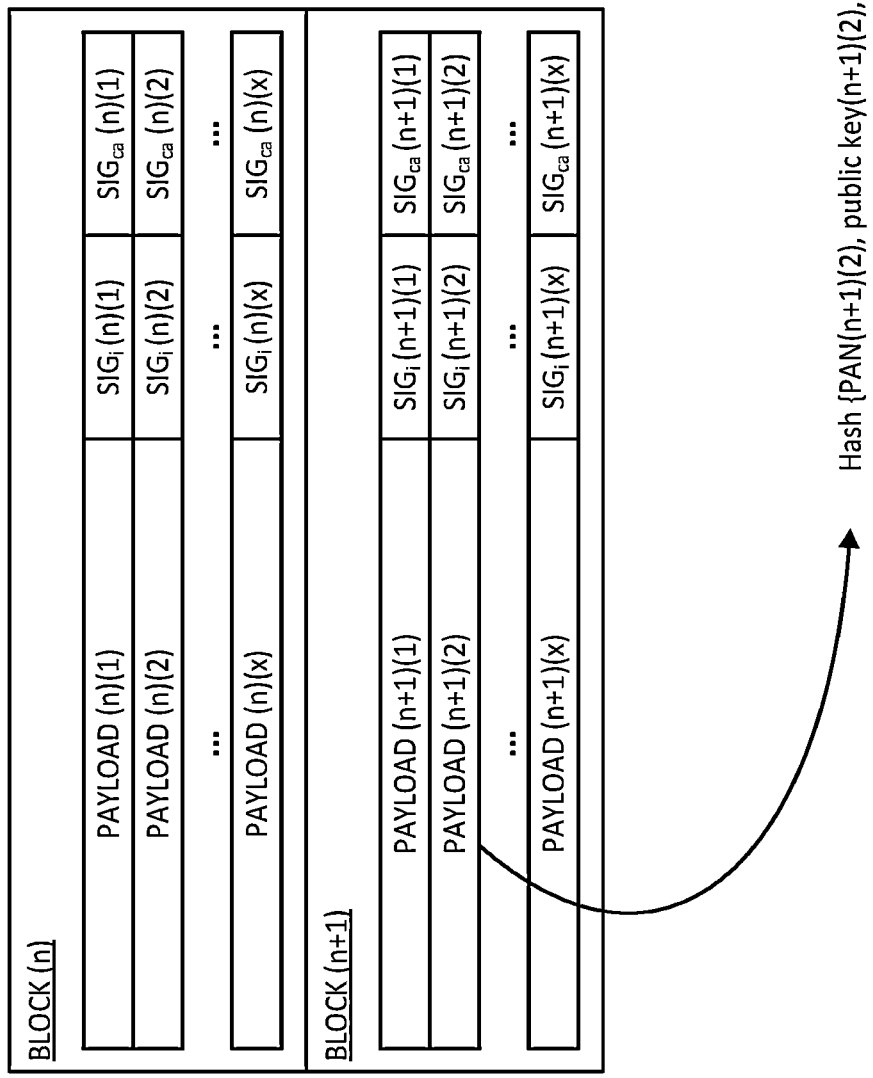
FIG. 6 illustrates a portion of a blockchain, according to some embodiments.

FIG. 6 illustrates a portion of a blockchain 600, according to some embodiments. The portion of the blockchain 600 shown in FIG. 6 includes two blocks—block(n) and block (n+1). Each of the blocks may include one or more records, for example, 'x' number of records as shown. Each record may include a payload. Thus, the records in block(n) may include payload(n)(1) to payload(n)(x), and the records in block(n+1) may include payload(n+1)(1) to payload(n+1) (x). Each record may also have one or more signatures. For example, the record containing payload(n+1)(2) may include a first signature $SIG_i(n+1)(2)$ and a second signature $SIG_{ca}(n+1)(2)$.

According to some embodiments, blockchain 600 can be used to store records of credentials such as primary account numbers (PANS) or other account identifiers such as tokens. By way of example, the data in payload(n+1)(2) may include a hash value that is derived by applying a hash function to the PAN, the public key associated with a communication device that requested the PAN, and the hash value of the previous block (e.g., hash value of block(n)). The first signature of the record can be an issuer signature generated by an issuer (e.g., bank that issued the PAN) using an issuer private key, and the second signature can be a certificate authority signature generated by a certificate authority (e.g., a transaction processing network) using a certificate authority private key. In some embodiments, one or more of the signatures can be omitted from the record.

Figure 7:
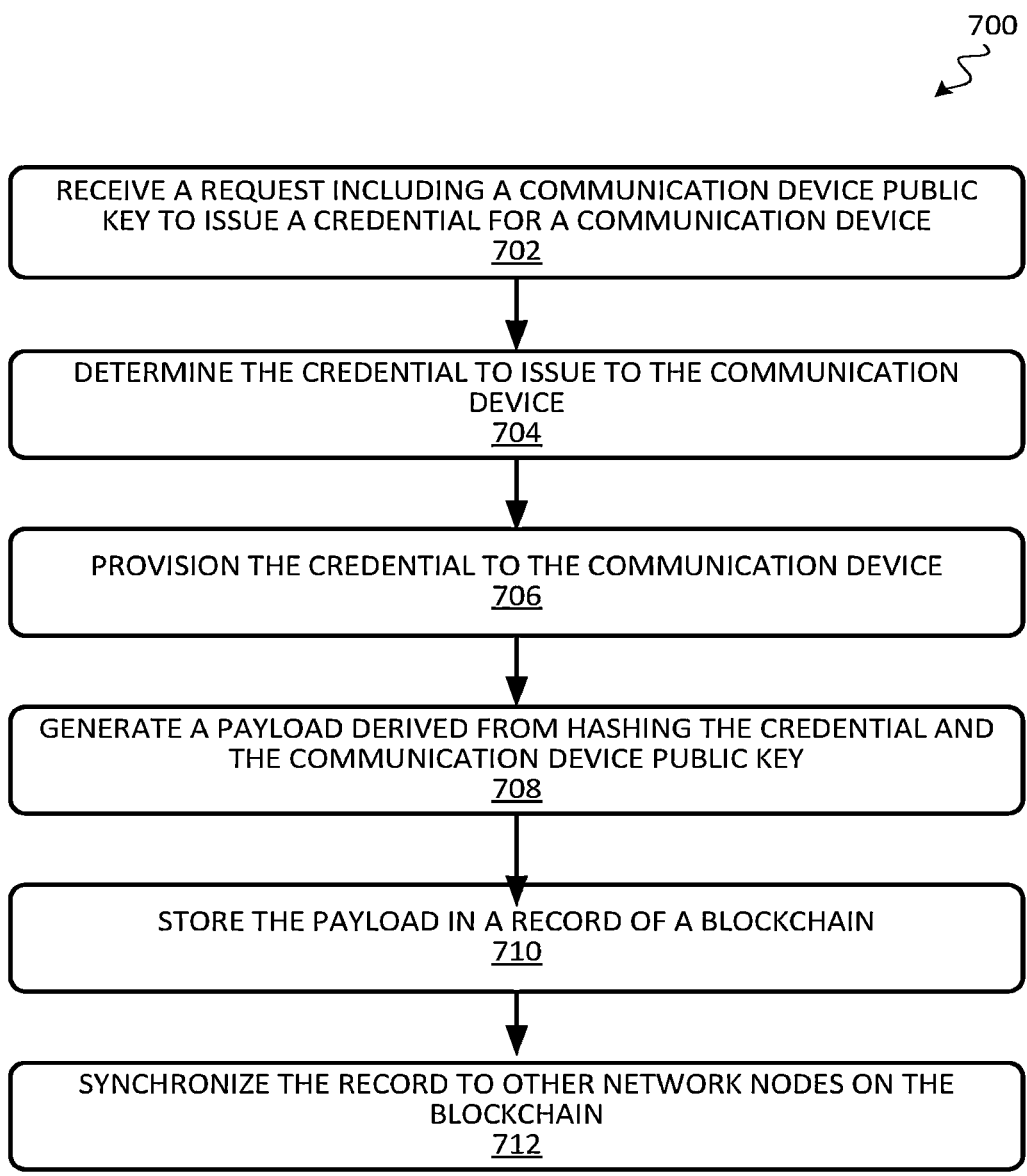
FIG. 7 illustrates a flow diagram of a process for adding a record to a blockchain, according to some embodiments.

FIG. 7 illustrates a flow diagram of a process 700 for adding a record to a blockchain, according to some embodiments. Process 700 can be performed, for example, by a credential issuer computer or an issuer network node, etc. Process 700 can being at block 702 by receiving a request to issue a credential for a communication device. The request may include a communication device public key associated with the communication device. At block 704, process 700 may determine the credential to issue to the communication device. For example, the credential can be randomly generated, generated using a predetermined algorithm, or retrieved from a datastore. In some embodiments, the credential can be an account identifier, or a token that is a substitute for the account identifier. At block 706, the credential can be provisioned to the communication device, for example, by storing the credential onto the communication device. In some embodiments, provisioning the credential to the communication device may include providing, to the communication device, a block identifier identifying which block in the blockchain will be used to store the record of the credential.

At block 708, process 700 may generate a payload derived from hashing the credential and the communication device public key. In some embodiments, the payload can further be derived from a hash of a previous block of the blockchain. At block 710, the payload can be stored in a record of a blockchain. In some embodiments, the record may include a signature generated with a signature key. The signature key can be an issuer key associated with the credential issuer computer, or a certificate authority key associated with a certificate authority. In some embodiments, the record may include two signatures generated with an issuer key and a certificate authority key, respectively. At block 712, the record is synchronized to other network nodes on the blockchain.

Figure 8:
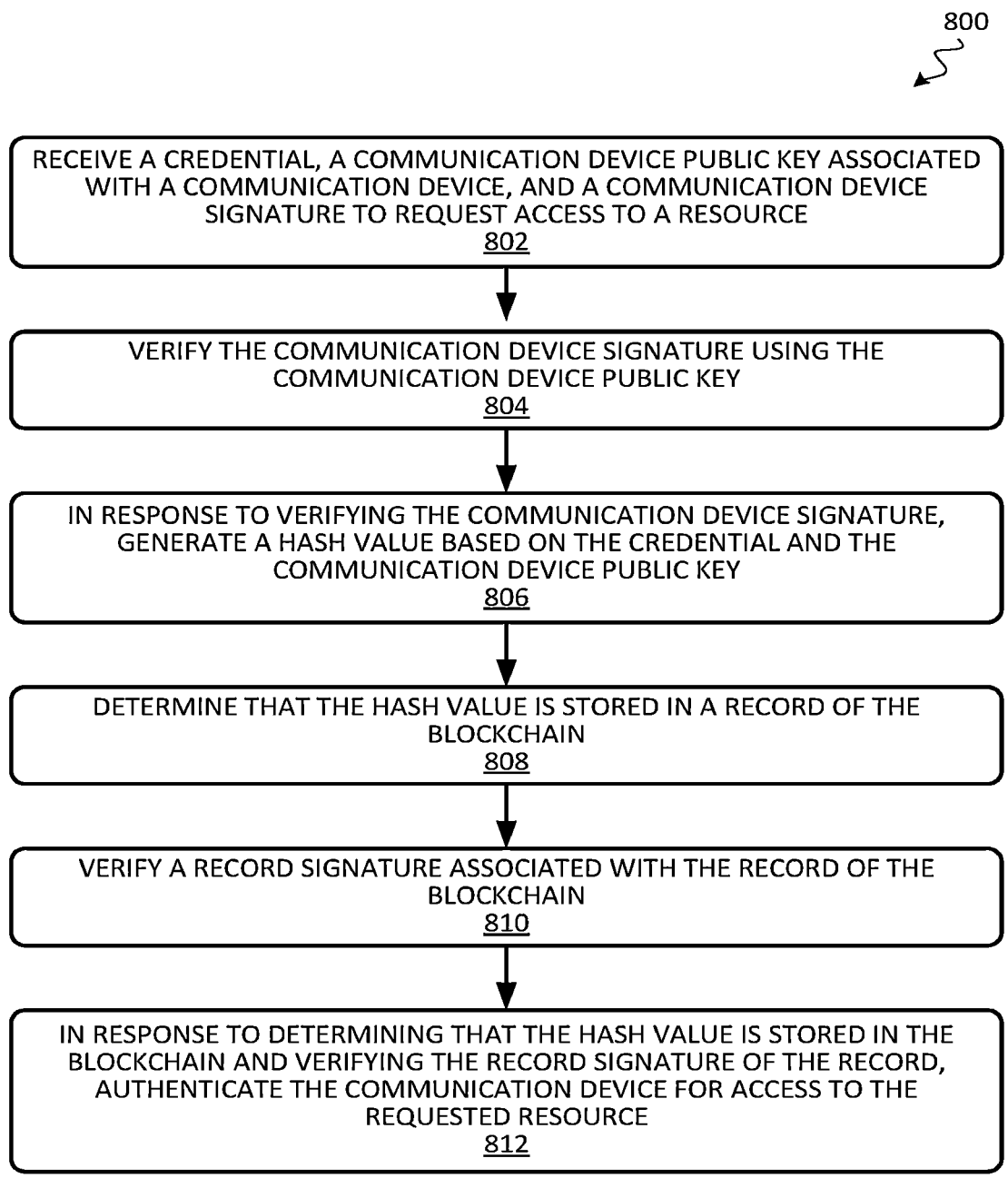
FIG. 8 illustrates a flow diagram of a process for verifying ownership of a credential, according to some embodiments.

FIG. 8 illustrates a flow diagram of a process 800 for verifying ownership of a credential, according to some embodiments. Process 800 can be performed, for example, by a verification computer or a verification network node, etc. Process 800 can being at block 802 by receiving a credential, a communication device public key associated with a communication device, and a communication device signature to request access to a resource. The communication device signature can be generated by encrypting a numeric value using a communication device private key corresponding to the communication device public key. In some embodiments, the numeric value can be one of a number provided to the communication device from the network node, a block identifier identifying which block in the blockchain contains the record of the credential, a hash of a previous block of the block in the blockchain containing the record of the credential, or some combination thereof. At block 804, the communication device signature can be verified using the communication device public key as part of authenticating the communication device. At block 806, in response to verifying the communication device signature, a hash value can be generated based on the credential and the communication device public key. At block 808, process 800 may determine that the hash value is stored in a record of the blockchain. At block 810, process 800 may verify the record signature associated with the record of the blockchain that contains the hash value. At block 812, in response to determining that the hash value is stored in the blockchain and verifying the record signature of the record, the communication device can be authenticated for access to the requested resource.

Figure 9:
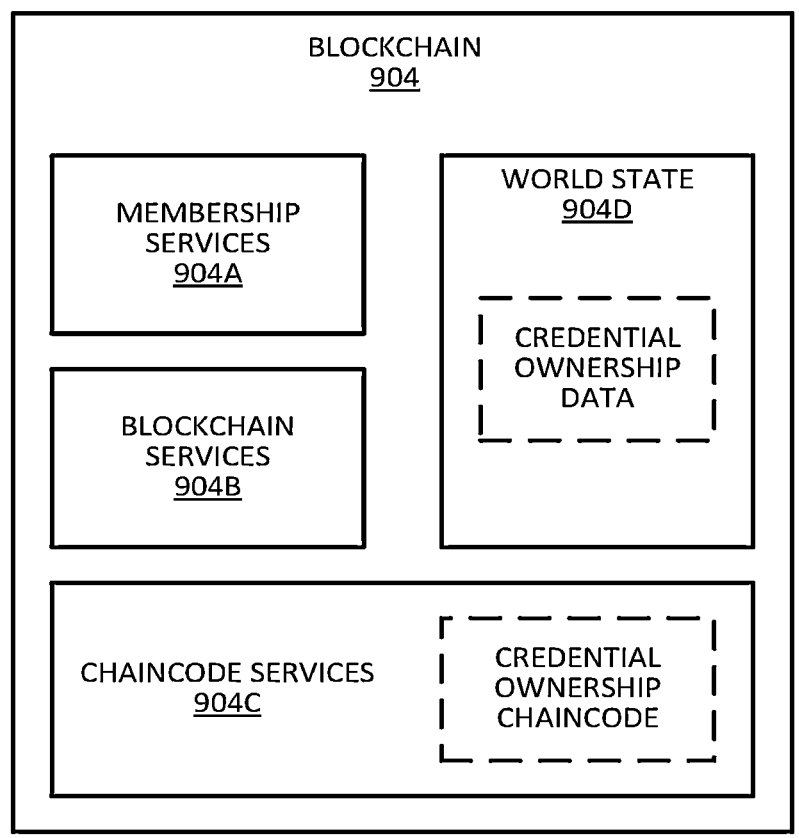
FIG. 9 illustrates a high-level blockchain architecture, according to some embodiments.

FIG. 9 illustrates a high-level blockchain architecture 904 that can be used to implement the techniques described herein, according to some embodiments. Blockchain architecture 904 can be, for example, a Hyperledger Fabric, and may include membership services software block 904A, blockchain services software block 904B, chaincode services software block 904C, and a world state database 904D. In some embodiments, chaincode services software block 904C contains the core logic of the application. It may receive requests from different participants in the network, such as issuers. Chaincode services software block 904C can translate these requests into operations performed on the data stored in the blockchain. Chaincode services software block 904C may expose or grant functionality to issuers such as the ability to create or publish a new record to the blockchain indicating the association between a credential and a public key. Chaincode services software block 904C may also enable issuers to remove the association between a credential and a public key, or mark a record as having expired or become invalid. Chaincode services software block 904C may further allow third-party subscribers such as merchants to query the blockchain for a record or association between a credential and a public key.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A computer-implemented method comprising:
   receiving, by a credential issuer computer, a request to issue a credential for a communication device, the request including a communication device public key associated with the communication device, wherein the credential is a sixteen digit number;
   determining, by the credential issuer computer, the credential to issue to the communication device;
   provisioning, by the credential issuer computer, the credential to the communication device by storing the credential in a secured memory of the communication device;
   generating, by the credential issuer computer, a payload derived from hashing the credential and the communication device public key;
   storing, by the credential issuer computer, the payload in a record of a blockchain, the blockchain comprising a plurality of blocks, each block containing one or more records, and the record signed with an issuer key associated with the credential issuer computer and a certificate authority key associated with a certificate authority, where the certificate authority is a trusted entity that issues certificates to other entities to certify identities of the other entities, wherein the certificates include information about a cryptographic key and information about the identity of an owner of the cryptographic key, and wherein the other entities include the credential issuer computer and a merchant computer that can receive the credential; and
   synchronizing, by the credential issuer computer, the record to other network nodes on the blockchain.

2. The computer-implemented method of claim 1, wherein the payload is further derived from a hash of a previous block of the blockchain.

3. The computer-implemented method of claim 1, wherein provisioning the credential to the communication device includes providing to the communication device a block identifier identifying which block in the blockchain contains the record.

4. The computer-implemented method of claim 1, wherein the credential is an account identifier, or a token that is a substitute for the account identifier.

5. The computer-implemented method of claim 1, wherein determining the credential comprises generating the credential randomly or using a predetermined algorithm.

6. The computer-implemented method of claim 1, wherein determining the credential comprises retrieving the credential from a database.

7. The computer-implemented method of claim 1, wherein the blockchain comprises a Hyperledger Fabric.

8. The computer-implemented method of claim 1, wherein the other network nodes on the blockchain comprise a plurality of verification nodes configured to process user requests to access resources.

9. The computer-implemented method of claim 1, wherein the issuer key is an issuer private key.

10. The computer-implemented method of claim 9, wherein the credential issuer computer comprises a hardware security module (HSM) that stores the issuer private key and a plurality of public keys associated with other entities.

11. A credential issuer computer comprising:
   a processor; and
   a non-transitory computer-readable medium storing instructions executable by the processor for performing processing comprising:
   receiving a request to issue a credential for a communication device, the request including a communication device public key associated with the communication device, wherein the credential is a sixteen digit number;
   determining the credential to issue to the communication device;
   provisioning the credential to the communication device by storing the credential in a secured memory of the communication device;
   generating a payload derived from hashing the credential and the communication device public key;
   storing the payload in a record of a blockchain, the record signed with an issuer key associated with the credential issuer computer and a certificate authority key associated with a certificate authority, where the certificate authority is a trusted entity that issues certificates to other entities to certify identities of the other entities, wherein the certificates include information about a cryptographic key and information about the identity of an owner of the cryptographic key, and wherein the other entities include the credential issuer computer and a merchant computer that can receive the credential; and
   synchronizing the record to other network nodes on the blockchain.

12. The credential issuer computer of claim 11, wherein the payload is further derived from a hash of a previous block of the blockchain.

13. The credential issuer computer of claim 11, wherein provisioning the credential to the communication device includes providing to the communication device a block identifier identifying which block in the blockchain contains the record.

14. The credential issuer computer of claim 11, wherein determining the credential comprises generating the credential randomly or using a predetermined algorithm.

15. The credential issuer computer of claim 11, wherein determining the credential comprises retrieving the credential from a database.

16. The credential issuer computer of claim 11, wherein the credential is an account identifier.

17. The credential issuer computer of claim 11, wherein the credential is a token that is a substitute for an account identifier.

18. The credential issuer computer of claim 11, wherein the other network nodes on the blockchain comprise a plurality of verification nodes configured to process user requests to access resources.

19. The credential issuer computer of claim 11, wherein:
   the issuer key is an issuer private key; and
   the credential issuer computer further comprises a hardware security module (HSM) that stores the issuer key and a plurality of public keys associated with other entities.

* * * * *